United States Patent
Kung et al.

(10) Patent No.: US 6,381,220 B1
(45) Date of Patent: Apr. 30, 2002

(54) MONITORING SELECTED IP VOICE CALLS THROUGH ACTIVITY OF A WATCHDOG PROGRAM AT AN IP-ADDRESSING MAPPING CHECK POINT

(75) Inventors: Fen-Chung Kung, Bridgewater; Jesse Eugene Russell, Piscataway; Anish Sankalia, Iselin; Spencer C. Wang, Parsippany, all of NJ (US)

(73) Assignee: AT&T Corp, New York, NY (US)

( * ) Notice: Subject to any disclaimer, the term of this patent is extended or adjusted under 35 U.S.C. 154(b) by 0 days.

(21) Appl. No.: 09/375,754

(22) Filed: Aug. 18, 1999

(51) Int. Cl.[7] ............................................... H04L 12/28
(52) U.S. Cl. ........................ 370/250; 370/352; 370/390
(58) Field of Search ........................ 370/390, 466–469, 370/260–264; 232/352–353; 253/458; 250/498–503, 442, 490, 401, 229, 254; 379/67.1, 88.15, 106.09, 106.03, 156; 455/412–413, 465, 428–430, 12.1; 709/200–206, 223–229, 249; 713/200

(56) References Cited

U.S. PATENT DOCUMENTS 6,115,393 A * 9/2000 Engel et al. ................. 370/469
6,289,025 B1 * 9/2001 Pang et al. .................. 370/458

* cited by examiner

*Primary Examiner*—Kwang Bin Yao
*Assistant Examiner*—Prenell Jones

(57) ABSTRACT

Surveillance of IP voice calls over a public communication IP link is achieved by a WatchDog program, associated with an IP Address Mapping Check Point translating IP phone numbers into IP addresses, that are connected to a head end hub connected in turn to a Hybrid Fiber Coax (HFC) link of IP phone users or to a backbone network carrying IP voice packets.

4 Claims, 2 Drawing Sheets

MONITORING SELECTED IP VOICE CALLS THROUGH ACTIVITY OF A WATCHDOG PROGRAM AT AN IP-ADDRESSING MAPPING CHECK POINT

FIELD OF THE INVENTION

This invention relates to surveillance of telephone calls over a public communications link and is particularly concerned with providing assistance for such surveillance to law enforcement agencies. It particularly concerns surveillance of voice of IP telephones transmitted over IP (i.e., cable) networks.

BACKGROUND OF THE INVENTION

Requirements for enabling surveillance of electronic communications have been enacted into public law (e.g., Public Law 103-414 enacted Oct. 25, 1994; CALEA Communications Assistance for Law Enforcement Act) reciting requirements for assuring law enforcement access to electronic communications. Such access is required to be in real time, have full time monitoring capabilities, simultaneous intercepts, and feature service descriptions. The requirements specifically include capacity requirements and function capability. It is incumbent upon communication carriers to provide such capability and capacity.

While initially limited in scope, at present, to certain communications technology it is almost assured that it will be extended to new communication technologies in the near future.

SUMMARY OF THE INVENTION

Surveillance of IP voice calls over a public communication IP link is achieved in accord with principals of the invention by a WatchDog program, associated with an Address Mapping Center translating IP phone numbers into IP addresses, that are connected to a head end hub connected in turn to a Hybrid Fiber Coax (HFC) link of IP phone users or to a backbone network carrying IP voice packets.

In the illustrative example a WatchDog program with the address-mapping center is used for translating IP phone numbers to IP destination addresses. The IP addressing monitor is an IP element operating as a checkpoint which maps a telephone number to an IP address where the IP call is to be delivered. It also always delivers a duplicated packet to the monitoring watchdog for surveillance.

DETAILED DESCRIPTION

Figure 1:
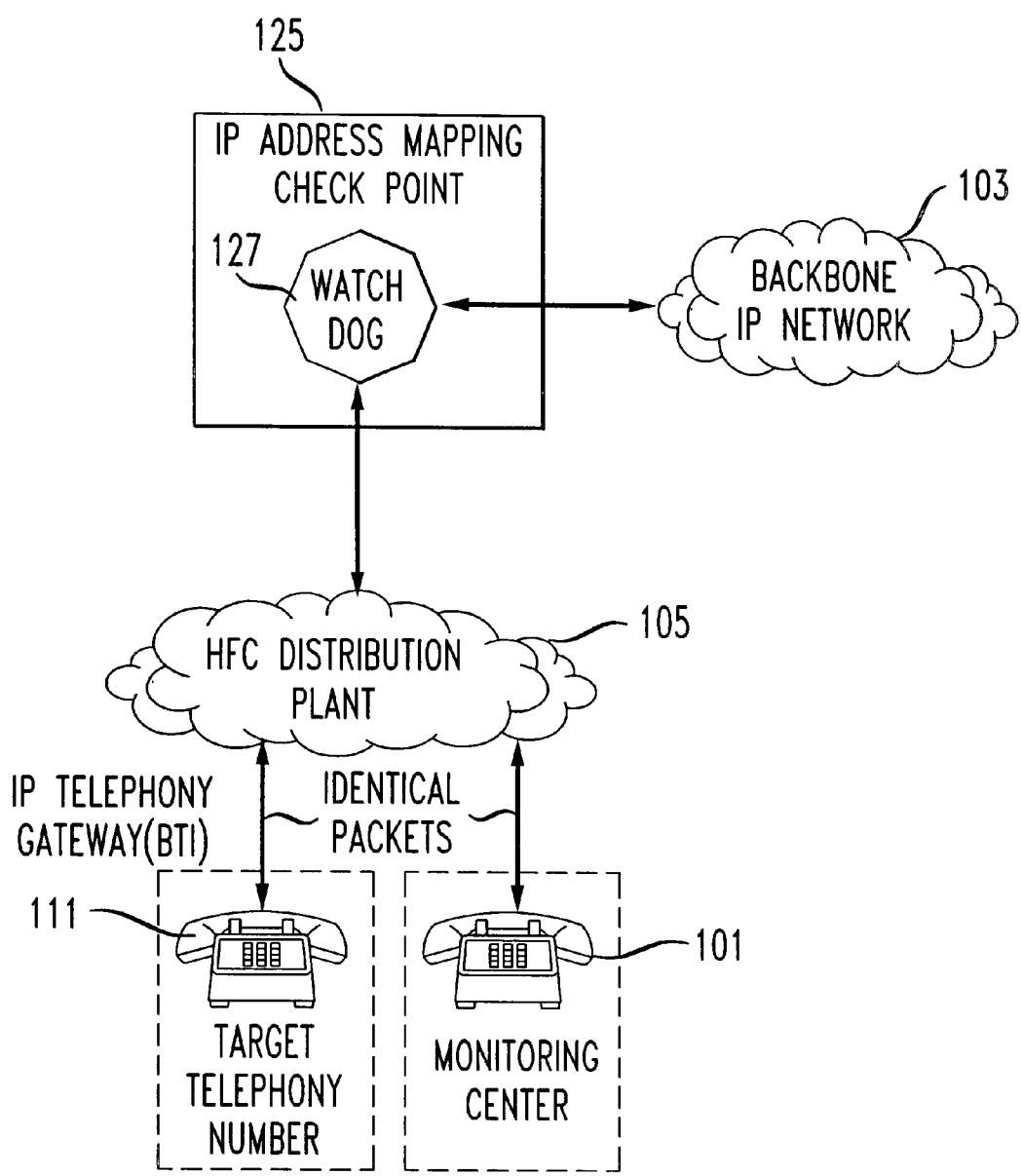
FIG. 1 is a block schematic of an IP communication system embodying the principles of the invention.

A monitoring station 101 is shown, in the FIG. 1, as connected to a backbone Internet Protocol (IP) network 103 via the connection provided by an Hybrid Fiber Coax (HFC) distribution plant 105. HFC distribution plant 105 is a distribution cabling arrangement employing both optical fiber and coaxial cable. Optical fiber is connected to the backbone and coaxial cable is connected to the terminating devices. The optical fiber and coaxial cable are joined by an electro-optical connection. The objective is to provide higher bandwidth to the terminating devices at a lower cost then is possible by using optical fiber alone.

The target telephone 111 to be monitored is also connected to the backbone IP network 103 via the same HFC distribution plant 105. Included with the backbone IP network is an IP Address Mapping Check Point (IP-AMCP) 125, which provides numbers for various devices, connected to the backbone network 103. The IP-AMCP may be embodied in a server within or connected to the network. It has the capability, through programming, of examining packet contents and authenticating users of the network. With specific WatchDog software the IP-AMCP identifies specific activity from designated telephone stations at a specified DN or IP address and can replicate/duplicate the packets of that phone which replicated/duplicated packets may be forwarded to a monitoring station.

Included with the IP-AMCP 125 is a WatchDog device or program 127, which performs observation/alerting functions, packet duplication and coding functions. It alerts the monitoring station 101 of any activity of the target telephone 111 and authenticates the activities of the monitoring station 101.

The monitor 101 is enabled, to perform surveillance of the target telephone 111, in response to a security code and target telephone number entered which is reviewed and approved by the IP-AMCP 125. The approval process is performed by the WatchDog 127, which decodes the supplied code and enables traffic flow of voice packets of the target telephone to the monitor station 101.

Figure 2:
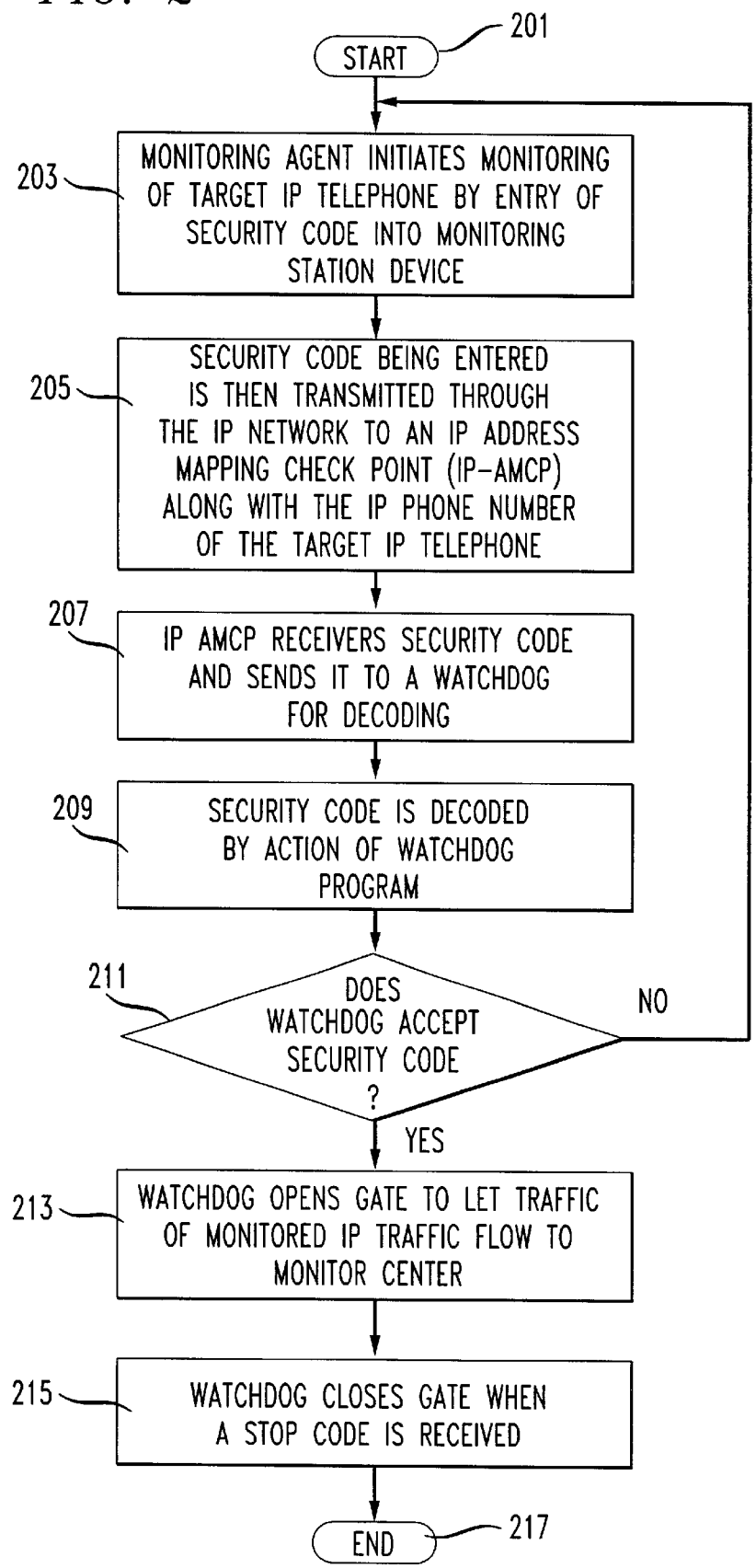
FIG. 2 is a flow chart of the method of the invention.

The operation of the surveillance system may be ascertained by reference to the flow chart disclosed in FIG. 2. The process starts at entry 201 and the monitoring agent initiates the monitoring function by entry of a security code as indicated in block 203. The entered security code is transmitted through an IP network to an IP Address Mapping Check Point along with the IP phone number of the target IP telephone as per the instructions of block 205. A WatchDog program associated with the IP-AMC receives and decodes the security code as per blocks 207 and 209. If it accepts the security code as authentic (yes) as per decision block 211 it allows the process to proceed to block 213. If not acceptable (no) the flow process returns to start at terminus 201.

The WatchDog opens a gate as per block 213 to allow traffic of the target IP phone to be duplicated and to flow to the monitor center. At the end of the monitoring session the monitor station sends a stop code which is evaluated by the WatchDog, as per block 215, and is acted upon to close the gate. The flow process ends as per terminus 217.

The following applications are being filed concurrently with the present application and are incorporated herein by reference. All applications have the same inventors (e.g., Kung, Russell, Sankalia and Wang):

1999-0186 Monitoring IP voice calls under command of a PSTN Phone;

1999-0187 Flexible Packet Technique for Monitoring Calls Spanning Different Backbone Networks;

1999-0188 Multiple Routing and Automatic network Detection of a Monitored Call from an Intercepted Targeted IP Phone to Multiple Monitoring Locations;

1999-0189 Secure Detection of an Intercepted Targeted IP Phone from Multiple Monitoring Locations;

1999-0190 Automatic IP Directory Number Masking and Dynamic Packet Routing for IP Phone Surveillance;

1999-0229 IP Voice Call Surveillance through use of Non-dedicated IP Phone with Signal Alert Provided to Indicate Content of Incoming Call prior to an Answer as being a Monitored Call.

While exemplary systems and methods embodying the present inventions are shown by way of example, it will be understood, of course, that the invention is not limited to these embodiments. Modifications may be made by those skilled in the art which differ from the specific details disclosed here, but which are still within the scope of the invention. Further elements of one invention may be readily included as elements of one of the other inventions. Those skilled in the art may combine or distribute the elements in many different ways without departing from the spirit and scope of the invention.

What we claim is:

1. A method of monitoring IP voice calls of an IP target telephone station over a public IP communication link, comprising the steps of:

installing WatchDog programming at an IP Address-Mapping Check Point (IP-AMCP) located within a public IP communication network;

programming a gateway terminal connected to a line end communication terminal to connect to and awake the WatchDog program in response to activity of the IP target telephone station;

transmitting a softkey security code from a monitoring station to the gateway terminal to the IP-AMCP for instructing the Watchdog to monitor calls of the IP target telephone station;

having the WatchDog activate the IP-AMCP to replicate voice packets of the call of the IP target telephone station; and transmitting the replicated voice calls from the IP-AMCP to the gateway terminal.

2. The method of claim 1, further including the step of:

ending a monitoring session by sending a stop code to the WatchDog from the monitoring station.

3. The method of claim 1, further including the step of:

alerting the monitoring station of activity of the IP target telephone station by means of the WatchDog.

4. The method of claim 1, further including the step of:

maintaining at the IP-AMCP a list of IP target telephone stations, which may be placed under surveillance.

\* \* \* \* \*